United States Patent [19]

Teng et al.

[11] Patent Number: 4,767,169

[45] Date of Patent: Aug. 30, 1988

[54] THIN FILM WAVEGUIDE ELECTROOPTIC MODULATOR

[75] Inventors: Chia-Chi Teng, Edison; Dagobert E. Stuetz, Watchung, both of N.J.

[73] Assignee: Hoechst Celanese Corporation, Somerville, N.J.

[21] Appl. No.: 19,369

[22] Filed: Feb. 26, 1987

[51] Int. Cl.$^4$ ............................ G02B 6/10; G02F 1/35
[52] U.S. Cl. ................................. 350/96.14; 307/430; 350/96.12; 350/96.34; 350/356
[58] Field of Search ............... 350/96.11, 96.12, 96.13, 350/96.14, 96.15, 96.34, 356; 307/425–430; 528/373

[56] References Cited

U.S. PATENT DOCUMENTS

| 3,586,872 | 6/1971 | Tien | 350/96.12 X |
|---|---|---|---|
| 3,810,688 | 5/1974 | Ballman et al. | 350/96.14 |
| 3,868,589 | 2/1975 | Wang | 350/96.12 X |
| 3,923,374 | 12/1975 | Martin | 350/96.14 |
| 3,951,513 | 4/1976 | Masi | 350/96.14 |
| 4,515,429 | 5/1985 | Smith et al. | 350/96.34 X |
| 4,605,869 | 8/1986 | Choe | 307/425 |
| 4,607,095 | 8/1986 | Kuder | 528/337 |
| 4,624,872 | 11/1986 | Stuetz | 428/1 |
| 4,655,554 | 4/1987 | Armitage | 350/356 X |
| 4,694,048 | 9/1987 | Choe | 307/425 X |
| 4,694,066 | 9/1987 | DeMartino et al. | 528/373 |
| 4,707,303 | 11/1987 | Buckley et al. | 307/425 X |
| 4,711,532 | 12/1987 | Choe | 350/356 X |

OTHER PUBLICATIONS

Griffin et al., "Synthesis of Sidechain Liquid Crystal Polymers For . . . " *Proc. of SPIE*, vol. 682, Aug. 1986, pp. 65–69.

Schnur et al., "Prospectus for . . . Liquid–Crystal Waveguides," *Naval Research Lab Report* 7507, Nov. 1972, pp. 1–18.

Sasaki et al, "Second Harmonic Generation . . . with . . . Optical Waveguide," *Appl. Phys. Lett*, vol. 45, No. 4, Aug. 1984, pp. 333–334.

Uesugi et al., "Electric Field Tuning . . . in . . . Optical Waveguide," ]Appl. Phys. Lett., vol. 34, No. 1, Jan. 1979, pp. 60–62.

Willaims, "Organic Polymeric and Non–Polymeric Materials with Large . . . ", *Angew. Chem. Int. Ed. Engl.* 23 (1984), pp. 690–703, Sep. 1984.

Zyss, "Nonlinear Organic Materials for Integrated Optics: a Review", *J. of Molecul. Electronics*, vol. 1, 1985, pp. 25–45.

Neal et al., "Second Harmonic Generation From LB Superlattices . . . ", *Electronics Letters*, vol. 22, Apr. 24, 1986, p. 3.

LeBarny et al., "Some New Side–Chain Liquid Crystalline Polymers For . . . ", *Proc. of SPIE*, vol. 682, Aug. 1986, pp. 56–64.

*Primary Examiner*—John Lee
*Attorney, Agent, or Firm*—Depaoli & O'Brien

[57] ABSTRACT

This invention provides a thin film waveguide electrooptic intensity modulation device. The thin film waveguide is an isotropic organic medium which exhibits nonlinear optical response. The device is adapted to modulate waveguided radiation by refractive index change commensurate with change in an applied electric field.

39 Claims, 1 Drawing Sheet

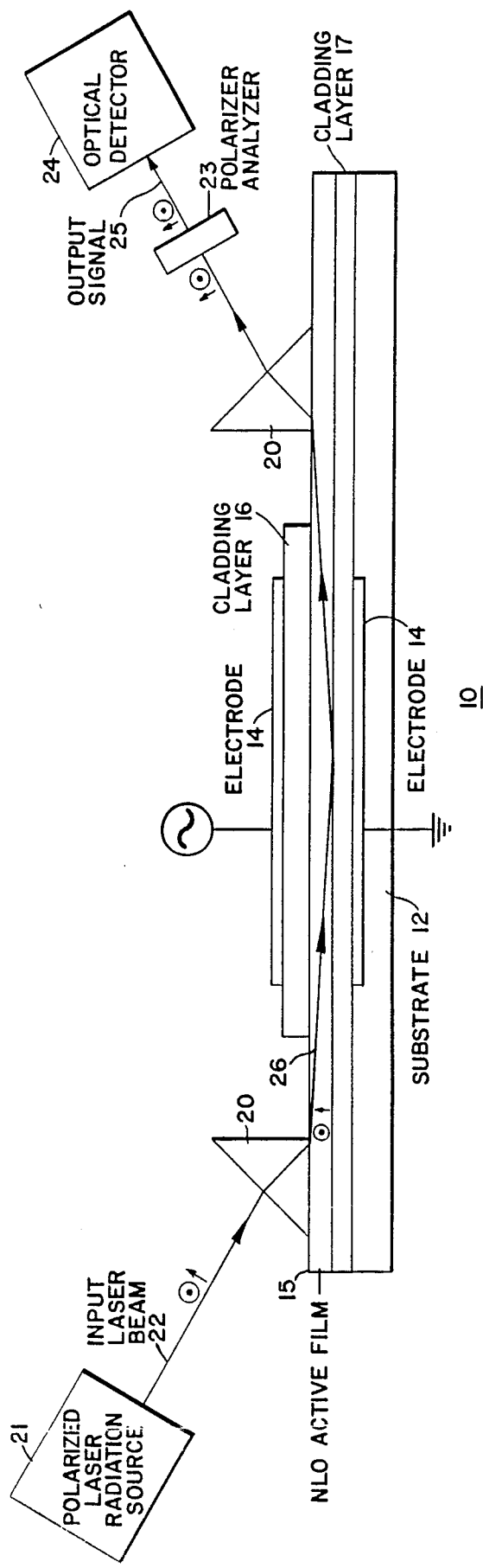

THIN FILM WAVEGUIDE ELECTROOPTIC MODULATOR

BACKGROUND OF THE INVENTION

Electrooptic intensity modulators utilizing bulk inorganic crystals are well known and widely utilized. Waveguide electrooptic modulators are a more recent development, and are described in literature such as Applied Physics Letters, 21, No. 7, 325 (1972); 22, No. 10, 540 (1973); and U.S. Pat. Nos. 3,586,872; 3,619,795; 3,624,406; 3,806,223; 3,810,688; 3,874,782; 3,923,374; 3,947,087; 3,990,775; and references cited therein.

One of the principal advantages of an optical waveguide configuration as contrasted to bulk crystals is that much higher intensity electric fields may be used with the optical waveguide configuration and also much lower capacitive values may be realized. Both of these operative characteristics are necessary to achieve high speed operation of such electrooptic modulators.

A thin film waveguide electrooptic modulator can operate employing one of three modulating mechanisms, i.e., Mach-Zehnder interferometry, directional coupling, or rotation of the optical polarization.

For a Mach-Zehnder interferometry type of electrooptical modulator, an optical beam is guided into a linear thin film waveguide and split into two arms, one of which is sandwiched between a pair of electrodes, and subsequently the arms are recombined into a single output beam. A phase shift between the light guided in the two different arms occurs when a voltage is applied to the electrodes and creates a change in the index of refraction in one of the arms due to either the Pockels or Kerr effect. The modulation of the output occurs since the beams in the two arms either add or cancel when they recombine depending on the phase relationship between them. The device requires a single mode linear waveguide for beam splitting and recombination.

For the directional coupling type of modulator, the optical beam is coupled into one of two adjacent linear waveguides and coupled out from the other guide. The amount of optical power which is transferred from one guide to the other guide depends on the index of refraction of the medium between the channels. By applying an electric field and altering the index of refraction between the channels, the power transferred, and hence output from either guide, can be modulated.

The modulating mechanism for the polarization type of modulator is the phase shift between the transverse electric (TE) and transverse magnetic (TM) modes in the same waveguide due to an electric field applied parallel or perpendicular to the surface of the waveguide which creates a directional change in the index of refraction in the waveguide due to a Pockels or Kerr nonlinear optical effect.

For a low voltage operating electrooptic modulator, highly responsive nonlinear optical media are required. LiNbo₃ has been an important inorganic species for waveguide electrooptic modulator construction. However, there are certain inherent disadvantages in the use of LiNbO₃ or other inorganic compound in an electrooptic modulator, such as the limitation of the input optical power due to the inherent photorefractive effect, and the high fabrication cost for a LiNbO₃ high quality crystal.

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington D.C. 1983.

Organic nonlinear optical medium in the form of transparent thin substrates are described in U.S. Pat. Nos. 4,536,450; 4,605,869; 4,607,095; 4,615,962; 4,624,872; and references cited therein.

The above recited publications are incorporated herein by reference.

There is a continuing research effort to develop new nonlinear optical organic media and electrooptic devices adapted for laser modulation, information control in optical circuitry, and the like. The potential utility of organic materials with large second order and third order nonlinearities for very high frequency application contrasts with the bandwidth limitations of conventional inorganic electrooptic materials.

Accordingly, it is an object of this invention to provide a novel electrooptic modulator.

It is another object of this invention to provide an electrooptic intensity modulator which contains an organic nonlinear optical component.

It is a further object of this invention to provide a polymeric thin film waveguide electrooptic intensity modulator.

Other objects and advantages of the present invention shall become apparent from the accompanying description and figures.

DESCRIPTION OF THE INVENTION

One or more objects of the present invention are accomplished by the provision of a thin film waveguide electrooptic intensity modulation device comprising (1) a transparent optical waveguiding thin film on a supporting substrate, wherein the thin film comprises an organic medium which exhibits nonlinear optical response; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of $2\pi$ and the output radiation is linearly polarized; and (3) a pair of elongated strip electrodes parallel to the waveguiding direction and situated in an intermediate zone between the positioned coupling means, and said electrodes are in a spaced proximity for application of a uniform electric field to the thin film waveguide.

In another embodiment this invention provides a thin film waveguide electrooptic intensity modulation device comprising (1) a transparent optical waveguiding thin film on a supporting substrate, wherein the thin film comprises an isotropic organic polymer medium which exhibits nonlinear optical response, and the waveguiding thin film is laminated between two cladding layers which have a lower index of refraction than the cladded thin film; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of $2\pi$ and the output radiation is linearly polarized; (3) a pair of elongated strip electrodes parallel to the waveguiding direction and situated in an intermediate zone between the positioned coupling means, and said electrodes are connected to a voltage source and are in a spaced proximity for application of a uniform electric field to the thin film waveguide; wherein the device is adapted to modulate waveguided radiation by refractive index change in the waveguide medium in accordance with the following equations:

$$\Gamma = \Gamma_o + \delta\phi$$

$$\frac{I_o}{I} = \sin\frac{2\Gamma}{2}$$

where $\Gamma$ is the radiation phase retardation; $\Gamma_o$ is the radiation phase retardation by the thin film waveguide medium; $\delta\phi$ is the radiation phase shift caused by the applied voltage; I is the input electromagnetic radiation signal; and $I_o$ is the output electromagnetic radiation signal; and wherein the device is in combination with (4) a linearly polarized coherent electromagnetic radiation generating means; and (5) a polarization-sensitive analyzer.

In a further embodiment this invention provides a thin film waveguide electrooptic intensity modulation device comprising (1) a transparent optical waveguiding thin film on a supporting substrate, wherein the thin film comprises an isotropic organic polymer medium which exhibits nonlinear optical response, and the waveguiding thin film is laminated between two cladding layers which have a lower index of refraction than the cladded thin film; (2) a pair of optical input-output coupling means which are structurally integrated with the waveguiding thin film for coupling linearly polarized coherent electromagnetic radiation to the said thin film, wherein the coupling means are in spaced positions such that an optical phase between transverse electric mode and transverse magnetic mode of waveguided electromagnetic radiation is an integral multiple of $2\pi$ and the output radiation is linearly polarized; (3) a pair of elongated strip electrodes parallel to the waveguiding direction and situated in an intermediate zone between the positioned coupling means, and said electrodes are connected to a voltage source and are in a spaced proximity for application of a uniform electric field to the thin film waveguide; wherein the device is adapted to modulate waveguided radiation by refractive index change in the waveguide medium in accordance with the following equations:

$$\Gamma = \Gamma_o + \delta\phi$$

-continued $$\frac{I_o}{I} = \sin\frac{2\Gamma}{2}$$

where $\Gamma$ is the radiation phase retardation; $\Gamma_o$ is the radiation phase retardation by the thin film waveguide medium; $\delta\phi$ is the radiation phase shift caused by the applied voltage; I is the input electromagnetic radiation signal; and $I_o$ is the output electromagnetic radiation signal; and wherein the device is in combination with (4) a linearly polarized coherent electromagnetic radiation generating means: (5) a polarization-sensitive analyzer; and (6) a photodetector means.

The Kerr effect and Pockels effect in the $\Gamma$ phase retardation respectively correspond to the equations:

$$\text{Kerr} \quad \delta\phi = \frac{2\pi l}{\lambda}\eta_2\left(\frac{V}{d}\right)^2$$

$$\text{Pockels} \quad \delta\phi = \frac{2\pi l}{\lambda}\eta^3 r\frac{V}{d}$$

where l is the length of the electrode pair; $\lambda$ is the optical wavelength; $\eta_2$ is the Kerr coefficient; V is the applied voltage; d is the distance between electrodes ; $\eta$ is the index of refraction of the waveguide film; and r is the Pockels coefficient.

When $\Gamma_o = \frac{\pi}{2}$ and $\delta\phi << \Gamma_o$, $V = V_m \sin\omega_m t$.

The input-output signals are represented by the equations:

$$\text{Kerr} \quad \frac{I_o}{I} = \frac{1}{2}\left(1 + \frac{\Gamma'}{2} - \frac{1}{2}\Gamma'\cos 2\omega_m t\right)$$

$$\text{Pockels} \quad \frac{I_o}{I} = \frac{1}{2}(1 + \Gamma'\sin\omega_m t)$$

where $\Gamma'$ is a constant; $\omega_m$ is the angular frequency of the applied AC field; $V_m$ is the amplitude of the voltage; and t is the time in seconds.

The applied voltage can be AC or DC, and typically will vary between about 0–400 volts, and the frequency of the applied field will vary between DC and gigahertz region.

BRIEF DESCRIPTION OF THE DRAWING

Referring to the drawing, FIG. 1 is a perspective view of a thin film waveguide electrooptic intensity modulation device in accordance with the present invention.

The waveguide electrooptic device 10 in FIG. 1 is a construction of composite layers consisting of substrate 12; a pair of elongated strip electrodes 14; a nonlinear optically active organic polymer thin film 15; a first cladding layer 16 and a second cladding layer 17; and a pair of prism coupling means 20.

In practice device 10 is utilized in combination with polarized laser radiation source 21 which provides input laser beam 22; polarizer 23 which functions as a polarization-sensitive analyzer; and photodetector 24 which functions to convert output signal 25 to a reconstructed electrical signal. Waveguided radiation 26 is coupled to thin film 15 with the pair of prism coupling means 20.

The term "transparent" as employed herein refers to a thin film waveguide medium which is transparent or light transmitting with respect to incident fundamental and created light frequencies. In a present invention waveguide electrooptic device, the thin film nonlinear optical medium is transparent to both the incident and exit light frequencies.

The term "isotropic" as employed herein refers to a transparent thin film organic waveguide medium in which the optical properties are equivalent in all tensor directions.

The term "external field" as employed herein refers to an electric, magnetic or mechanical stress field which is applied to a substrate of mobile organic molecules, to induce dipolar alignment of the molecules parallel to the field.

The input linearly polarized coherent electromagnetic radiation preferably is a laser beam such as a helium-neon (0.6328 micron) laser or an argon-neon laser (0.5145 or 0.4880 micron).

The coupling means can consist of a pair of prism couplers, such as Schott $SF_6$ optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775.

The substrate 12 as illustrated in FIG. 1 can be constructed of any convenient non-conducting medium such as plastic or glass.

The thin film organic waveguiding medium of the invention electrooptic device is transparent and isotropic, and exhibits nonlinear optical response.

A typical thin film organic medium comprises a blend of a polymer host and a guest component. The nonlinear optical properties of the thin film can be controlled by the guest component alone, or both the host and the guest components can exhibit nonlinear optical susceptibility.

Illustrative of suitable host polymers are poly(methyl methacrylate), cellulose acetate, polysiloxane, polyacrylamide, polyacrylonitrile, and the like.

Illustrative of suitable guest compounds are 4-nitroaniline, 2-methyl-4-nitroaniline, 4-N,N-dimethylamino-4'-nitrostilbene(DANS), and the like.

Other suitable nonlinear optically active guest compounds are illustrated by quinodimethane structures corresponding to the formulae:

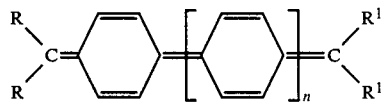

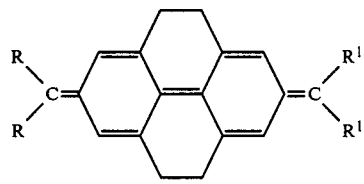

-continued

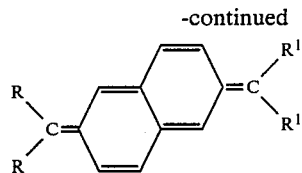

where n is an integer with a value between about 0–3; R and $R^1$ are substituents selected from hydrogen and aliphatic, alicyclic and aromatic groups containing between about 1–20 carbon atoms, and at least one of the R substituents is an electron-donating group, and at least of the $R^1$ substituents is an electron-withdrawing group.

Illustrative of nonlinear optically active quinodimethane species are 7,7-di(n-hexyldecylamino)-8,8-dicyanoquinodimethane; 13,13-diamino-14,14-dicyanodiphenoquinodimethane; 13,13-di(dimethylamino)-14,14-dicyanodiphenoquinodimethane; 13,13-di(n-hexadecylamino)-14,14-dicyanodiphenoquinodimethane; 13,13-ethylenediamino-14,14-dicyanodiphenoquinodimethane; 13,13-di(dimethylamino)-14,14-dicyano4,5,9,10-tetrahydropyrenoquinodimethane; 13,13-di(n-hexadecylamino)-14,14-dicyano-4,5,9,10-tetrahydropyrenoquinodimethane; and the like.

The synthesis of quinodimethane compounds as listed above is described in copending patent application Ser. No. 748,583, filed June 25, 1985 (now U.S. Pat. No. 4,640,800); and copending patent application Ser. No. 864,203, filed May 19, 1986 (now U.S. Pat. No. 4,707,305); incorporated herein by reference.

The term "electron-donating" as employed herein refers to organic substituents which contribute electron density to the $\pi$-electron system when the conjugated electronic structure is polarized by the input of electromagnetic energy.

The term "electron-withdrawing" as employed herein refers to electronegative organic substituents which attract electron density from the $\pi$-electron system when the conjugated electron structure is polarized by the input of electromagnetic energy.

A particular host polymer is selected for ease of fabrication, optical properties, and compatibility with the organic guest component. The guest component typically will constitute between about 5–60 weight percent of a thin film waveguide guest/host medium.

A polymer which exhibits nonlinear optical response can be employed as a host component, or it can be utilized as a sole component. This type of organic component is illustrated by thermoplastic polymers which are characterized by a recurring monomeric unit corresponding to the formula:

where P is a polymer main chain unit, S is a flexible spacer group having a linear chain length of between about 0–20 atoms, M is a pendant group which exhibits a second order nonlinear optical susceptibility $\beta$ of at least about $5 \times 10^{-30}$ esu as measured at 1.91 $\mu$m excitation wavelength, and where the pendant groups comprise at least about 10 weight percent of the polymer, and the polymer has a glass transition temperature above about 40° C.

Isotropic phase side chain liquid crystalline polymeric media exhibiting third order nonlinear optical response are described in copending patent application Ser. No. 915,180, filed Oct. 3, 1986.

In another embodiment this invention contemplates a thin film waveguide medium which has an external field-induced alignment of molecular dipoles, such as nonlinear optically active guest molecules, or nonlinear optically active mesogenic side chains of polymers as described above.

Poling of a thin film waveguide medium can be accomplished conveniently by heating the medium near or above its melting point or glass transition temperature, then applying a DC electric field (e.g., 400–100,000 V/cm) to the medium to align molecular dipoles in a uniaxial orientation. The medium then is cooled while the medium is still under the influence of the applied DC electric field. In this manner a stable and permanent molecular orientation is immobilized in a rigid structure.

A nonlinear optically active thin film waveguide medium can exhibit a Kerr effect, and then after poling can exhibit a Pockels effect. A centrosymmetric optical medium exhibits third order nonlinear optical susceptibility $\chi^{(3)}$, and a noncentrosymmetric optical medium exhibits second order nonlinear optical susceptibility $\chi^{(2)}$.

Theoretical considerations in connection with nonlinear optics are elaborated by Garito et al in chapter 1 of the ACS Symposium Series 233 (1983); and by Lipscomb et al in J. Chem., Phys., 75, 1509 (1981), incorporated herein by reference. See also Lalama et al, Phys. Rev., A20, 1179 (1979); and Garito et al, Mol. Cryst. and Liq. Cryst., 106,219 (1984); incorporated herein by reference.

A present invention thin film waveguide medium preferably is coated on each surface with a cladding layer, and the cladding layers have a lower index of refraction than does the cladded thin film waveguide. The pair of cladding layers can be organic or inorganic, and can be the same or different.

The thin film waveguide layer and the cladding layers, respectively, can be composited with the substrate as shown in FIG. 1 by conventional fabricating techniques such as spin coating, spraying, Langmuir-Blodgett deposition, sputtering, and the like, as appropriate for the respective materials.

One preferred type of cladding layer is spin coated glass. Another type is a cladding layer of an organic polymer such as polyvinyl alcohol, polyvinyl acetate, polyethylene oxide, poly(vinyl methyl ether), and the like.

Electrodes 14 in FIG. 1 can be a strip coating of a suitable conducting material such as aluminum, silver, gold, copper, indium-tin oxide, indium titanate, and the like, and are connected to a DC or AC power source.

The output beam of linearly polarized radiation which emits from the coupling means is directed through a polarization-analyzer means, that in FIG. 1 is represented as a polarizer which is in a crossed mode relative to the polarization plane of waveguided radiation in the absence of a moderating electric field.

When the FIG. 1 electrooptic system is operational, the electric field in the thin waveguide modulates waveguided radiation by change in refractive index commensurate with change in the electric field. The electric field causes a phase shift between the transverse electric (TE) and transverse magnetic (TM) modes of the electromagnetic radiation which is coupled in the thin film waveguide.

As the voltage increases in the device, the degree of rotation of the plane of polarized radiation increases. When the voltage increases from zero to the half wave voltage, the polarization plane rotates about ninety degrees. The amount of radiation which passes through the crossed polarizer-analyzer as output signal increases from zero to full transmission of waveguided radiation, as the polarization plane rotates over an arc of 90 degrees.

The following example is further illustrative of the present invention. The device components are presented as being typical, and various modifications in design and operation can be derived in view of the foregoing disclosure within the scope of the invention.

EXAMPLE

This Example illustrates the construction and operation of a waveguide electrooptic device in accordance with the present invention.

FIG. 1 illustrates a present invention polymeric thin film electrooptic modulator which utilizes a phase shift between the electromagnetic TE and TM modes being transmitted by the thin film waveguide.

The device consists of a glass substrate with a coated $InTiO_3$ thin film as the first electrode, one cladding layer on top of the $InTiO_3$ film, one layer of nonlinear optically active polymer as the guiding medium on top of the cladding layer, a second cladding layer on top of the guiding film, and finally one conducting layer on top of the second cladding layer.

The first cladding layer is $SiO_2$ formed by spin coating a glass solution (Allied 305) onto the glass substrate at 500 rpm for 8 seconds and 3000 rpm for 25 seconds, and baking the coated substrate at 400° C. for one hour. The thickness of the cladding layer is 1 micron after a double coating process.

The waveguiding layer is composed of polymethylmethacrylate (PMMA) blended with a 10% content of para-nitroaniline (PNA) as a nonlinear optically active component. The waveguiding layer is formed by dissolving 20% of the blend in trichloropropane and spin coating the solution onto the substrate at 2000 rpm for 20 seconds to provide a layer with a thickness of 4 microns.

The second cladding layer is composed of 75% hydrolyzed polyvinyl alcohol, which has an index of refraction slightly lower than that of the waveguiding layer. The second cladding layer is formed by spin coating a 30% water solution of the polyvinyl alcohol at 1300 rpm for 30 seconds to provide a 2 micron cladding layer. The second cladding layer is removed from the two prism positions by dissolution in water, so that the coupling prisms are in direct contact with the waveguiding film input-output coupling of waveguided radiation.

A linearly polarized laser beam is coupled into the guiding film by the first coupling prism. The polarization plane of the laser beam is at 45° relative to the incident plane so that both TE and TM modes are excited with equal intensities in the waveguide film. The beam is coupled out of the waveguide at the second coupling prism.

A polarizer is situated on the emerging beam with a polarization plane at 90° relative to the input beam polarization plane.

The output beam intensity is given by:

$$I_o = I \sin \frac{2\Gamma}{2} \quad (1)$$

where I is the input beam intensity, and $\Gamma$ is the phase retardation between the TE and TM modes in accordance with the following equation:

$$\Gamma = \Gamma_o + \epsilon\phi \quad (2)$$

where $\Gamma_o$ is the intrinsic phase retardation, $\epsilon\phi$ is the phase shift due to the applied voltage V, which induces a change of the index of refraction in the TM mode due to Pockels effect:

$$\delta\phi = \frac{2\pi l}{\lambda} \eta^3 r \frac{V}{d} \quad (3)$$

or Kerr effect:

$$\delta\phi = \frac{2\pi l}{\lambda} \eta_2 \left(\frac{V}{d}\right)^2 \quad (4)$$

where $\eta$ is the index of refraction of the waveguide, r is the Pockels coefficient, l is the length of the electrodes, d is the distance between the electrodes, $\lambda$ is the beam wavelength, and $\eta_2$ is the Kerr coefficient.

The intrinsic phase retardation mainly originates from the difference in the effective index of refraction between the TE and TM modes. By adjusting the second coupling prism to a position so that $\Gamma_o$ is a multiple of $2\pi$, the output intensity (eq. 1) vanishes, which corresponds to a linearly polarized emerging beam.

At an applied voltage (half wave voltage) where the phase shift $\delta\phi$ is $\pi$, the output beam intensity is maximized (eq. 1) which corresponds to a 90° rotation of the input beam polarization. The device functions as a high contrast digital optical switch.

Linear modulation of the optical signal is obtained by inserting a quarter wave plate in between the output coupling prism and the polarizer. With $\Gamma_o = 2m\pi + \pi/2$, $\delta\phi << \Gamma_o$, and $V = V_m \sin\omega_m t$, for Pockels effect eq. 1 is restated:

$$I_o \simeq \frac{I}{2}\left(1 + \frac{2\pi l}{\lambda}\eta^3 r \frac{V_m}{d}\sin\omega_m t\right) \quad (5)$$

Without external field poling of the nonlinear optically active molecules, the waveguide medium is centrosymmetric and no Pockels effect is observed. The Kerr effect, which is contributed mainly from the rotation of the PNA molecules in the polymer matrix, is the only mechanism for radiation modulation. The response time of the rotation of the molecules governs the modulation.

The half wave voltage varies from 50 volts to 500 volts when the applied voltage frequency is changed from DC to 10 kHertz. Beyond 10 kHertz, the half wave voltage significantly increases.

Two methods are utilized to create the Pockels effect in the waveguide medium of the device.

In the DC bias method, a DC voltage is applied to the electrodes of the device in addition to the AC voltage. The DC voltage aligns the PNA molecules, which have a high permanent electric dipole moment, and induces a noncentrosymmetry within the waveguide medium. The Pockels effect arises from the intrinsic second order optical response of the PNA molecules. The Pockels coefficient depends on the DC voltage. The device serves as a controllable optical switch and a gain controllable linear optical modulator by varying the applied DC voltage.

In the poling method, the device is heated to just below the phase transition temperature of the polymer, and a high voltage is applied to the electrodes. The PNA molecules are aligned by the high voltage. The device is cooled slowly while maintaining the applied field. The voltage is removed after the device has cooled to room temperature. The PNA molecular orientation provides a noncentrosymmetric medium, and a Pockels effect is observed. The half wave voltage of the device from the Pockels effect is around 700 volts.

What is claimed is:

1. A thin film waveguide electrooptic intensity modulation device comprising (1) a transparent optical waveguiding thin film on a supporting substrate, wherein the thin film comprises an organic medium which exhibits nonlinear optical response; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of $2\pi$ and the output radiation is linearly polarized; and (3) a pair of elongated strip electrodes parallel to the waveguiding direction and situated in an intermediate zone between the positioned coupling means, and said electrodes are in a spaced proximity for application of a uniform electric field to the thin film waveguide.

2. A thin film waveguide electrooptic intensity modulation device comprising (1) a transparent optical waveguiding thin film on a supporting substrate, wherein the thin film comprises an isotropic organic polymer medium which exhibits nonlinear optical response, and the waveguiding thin film is laminated between two cladding layers which have a lower index of refraction than the cladded thin film; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of $2\pi$ and the output radiation is linearly polarized; and (3) a pair of elongated strip electrodes parallel to the waveguiding direction and situated in an intermediate zone between the positioned coupling means, and said electrodes are connected to a voltage source and are in a spaced proximity for application of a uniform electric field to the thin film waveguide; and wherein the device is adapted to modulate waveguided radiation by refractive index change in the waveguide medium in accordance with the following equations:

$$\Gamma = \Gamma_o + \delta\phi$$

$$\frac{I_o}{I} = \sin\frac{2\Gamma}{2}$$

where $\Gamma$ is the radiation phase retardation; $\Gamma_o$ is the radiation phase retardation by the thin film waveguide medium; $\delta\phi$ is the radiation phase shift caused by the applied voltage; I is the input electromagnetic radiation signal; and $I_o$ is the output electromagnetic radiation signal.

3. A thin film waveguide electrooptic intensity modulation device comprising (1) a transparent optical waveguiding thin film on a supporting substrate, wherein the thin film comprises an isotropic organic polymer medium which exhibits nonlinear optical response, and the waveguiding thin film is laminated between two cladding layers which have a lower index of refraction than the cladded thin film; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of 2 $\pi$ and the output radiation is linearly polarized; (3) a pair of elongated strip electrodes parallel to the waveguiding direction and situated in an intermediate zone between the positioned coupling means, and said electrodes are connected to a voltage source and are in a spaced proximity for application of a uniform electric field to the thin film waveguide; and wherein the device is adapted to modulate waveguided radiation by refractive index change in the waveguide medium in accordance with the following equations:

$$\Gamma = \Gamma_o + \delta\phi$$

$$\frac{I_o}{I} = \sin\frac{2\Gamma}{2}$$

where $\Gamma$ is the radiation phase retardation; $\Gamma_o$ is the radiation phase retardation by the thin film waveguide medium; $\delta\phi$ is the radiation phase shift caused by the applied voltage; I is the input electromagnetic radiation signal; $I_o$ is the output electromagnetic radiation signal; and wherein the device is in combination with (4) a linearly polarized coherent electromagnetic radiation generating means; and (5) a polarization-sensitive analyzer.

4. A waveguide electrooptic device in accordance with claim 3 wherein the thin film comprises a side chain liquid crystalline polymer which exhibits nonlinear optical response.

5. A waveguide electrooptic device in accordance with claim 3 wherein the thin film comprises a polymer host and a guest component which exhibits nonlinear optical response.

6. A waveguide electrooptic device in accordance with claim 3 wherein the thin film comprises a polymer host and a guest component, each of which exhibits nonlinear optical response.

7. A waveguide electrooptic device in accordance with claim 3 wherein the thin film exhibits second order nonlinear optical susceptibility $\chi^{(2)}$.

8. A waveguide electrooptic device in accordance with claim 3 wherein the thin film exhibits third order nonlinear optical susceptibility $\chi^{(3)}$.

9. A waveguide electrooptic device in accordance with claim 3 wherein the coupling means are a pair of prisms.

10. A waveguide electrooptic device in accordance with claim 3 wherein the coupling means are a pair of diffraction gratings.

11. A waveguide electrooptic device in accordance with claim 3 wherein the electrodes are situated in a spaced proximity, with one electrode on each opposing side of the thin film waveguide.

12. A waveguide electrooptic device in accordance with claim 3 wherein the electrodes when under an applied voltage develop an electric field in the thin film waveguide which modulates waveguided radiation by change in refractive index commensurate with change in the electric field.

13. A waveguide electrooptic device in accordance with claim 3 wherein the electromagnetic radiation is a laser beam.

14. A waveguide electrooptic device in accordance with claim 3 wherein the polarization-sensitive analyzer is a polarizer which is crossed relative to the polarization plane of waveguided radiation in the absence of a moderating electric field.

15. A waveguide electrooptic device in accordance with claim 3 wherein the device is in further combination with a photodetector means.

16. A thin film waveguide electrooptic intensity modulation device comprising (1) a transparent optical waveguiding thin film on a supporting substrate, wherein the thin film comprises an isotropic organic polymer medium which exhibits nonlinear optical response, and the waveguiding thin film is laminated between two cladding layers which have a lower index of refraction than the cladded thin film; (2) a pair of optical input-output coupling means which are structurally integrated with the waveguiding thin film for coupling linearly polarized coherent electromagnetic radiation to the said thin film, wherein the coupling means are in spaced positions such that an optical phase shift between transverse electric mode and transverse magnetic mode of waveguided electromagnetic radiation is an integral multiple of 2 $\pi$ and the output radiation is linearly polarized; (3) a pair of elongated strip electrodes parallel to the waveguiding direction and situated in an intermediate zone between the positioned coupling means, and said electrodes are connected to a voltage source and are in a spaced proximity for application of a uniform electric field to the thin film waveguide: wherein the device is adapted to modulate waveguided radiation by refractive index change in the waveguide medium in accordance with the following equations:

$$\Gamma = \Gamma_o + \delta\phi$$

$$\frac{I_o}{I} = \sin\frac{2\Gamma}{2}$$

where $\Gamma$ is the radiation phase retardation; $\Gamma_o$ is the radiation phase retardation by the thin film waveguide medium; $\delta\phi$ is the radiation phase shift caused by the applied voltage; I is the input electromagnetic radiation signal; and $I_o$ is the output electromagnetic radiation signal; and wherein the device is in combination with (4) a linearly polarized coherent electromagnetic radiation generating means; (5) a polarization-sensitive analyzer; and (6) a photodetector means.

17. A waveguide electrooptic device in accordance with claim 16 wherein the thin film comprises an isotropic medium of a liquid crystalline polymer having a comb structure of mesogenic side chains which exhibit nonlinear optical response.

18. A waveguide electrooptic device in accordance with claim 16 wherein the thin film comprises an isotropic medium of a liquid crystalline polymer having a comb structure of mesogenic side chains which exhibit nonlinear optical response, and wherein the mesogenic side chains have a permanent external field-induced molecular alignment.

19. A waveguide electrooptic device in accordance with claim 16 wherein the thin film is centrosymmetric and exhibits a Kerr effect phase shift in accordance with the equation:

$$\delta\phi = \frac{2\pi l}{\lambda} \eta_2 \left(\frac{V}{d}\right)^2$$

where l is the length of the electrode pair; $\lambda$ is the optical wavelength; $\eta_2$ is the Kerr coefficient; V is the applied voltage; and d is the distance between the electrodes.

20. A waveguide electrooptic device in accordance with claim 16 wherein the thin film is noncentrosymmetric and exhibits a Pockels effect phase shift in accordance with the equation:

$$\delta\phi = \frac{2\pi l}{\lambda} \eta^3 r \left(\frac{V}{d}\right)$$

where l is the length of the electrode pair; $\lambda$ is the optical wavelength: $\eta$ is the index of refraction of the waveguide film; r is the Pockels coefficient; V is the applied voltage; and d is the distance between the electrodes.

21. A waveguide electrooptic device in accordance with claim 16 wherein the thin film comprises a polymer host, and a guest component which exhibits nonlinear optical response.

22. A waveguide electrooptic device in accordance with claim 16 wherein the thin film comprises a polymer host, and a guest component which exhibits nonlinear optical response and which has a permanent external field-induced molecular alignment.

23. A waveguide electrooptic device in accordance with claim 16 wherein the thin film comprises a polymer host and 2-methyl-4-nitroaniline as a guest component.

24. A waveguide electrooptic device in accordance with claim 16 wherein the thin film comprises a polymer host and 4-N,N-dimethylamino-4'-nitrostilbene as a guest component.

25. A waveguide electrooptic device in accordance with claim 16 wherein the thin film comprises a polymer host and a quinodimethane guest component corresponding to one of the formulae:

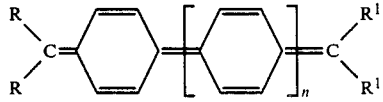

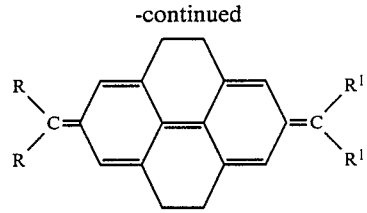

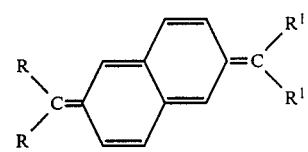

where n is an integer with a value between about 0–3; R and $R^1$ are substituents selected from hydrogen and aliphatic, alicyclic and aromatic groups containing between about 1–20 carbon atoms, and at least one of the R substituents is an electron-donating group, and at least one of the $R^1$ substituents is an electron-withdrawing group.

26. A waveguide electrooptic device in accordance with claim 16 wherein the thin film comprises a polymer host and 7,7-di(n-hexyldecylamino)-8,8-dicyanoquinodimethane as a guest component.

27. A waveguide electrooptic device in accordance with claim 16 wherein the thin film comprises a polymer host and 13,13-di(n-hexadecylamino)-14,14-dicyano-4,5,9,10-tetrahydropyrenequinodimethane as a guest component.

28. A waveguide electrooptic device in accordance with claim 16 wherein the thin film comprises a polymer host and 11,11-di(n-hexadecylamino)-12,12-dicyano-2,6-naphthoquinodimethane.

29. A waveguide electrooptic device in accordance with claim 16 wherein at least one of the cladding layers is glass.

30. A waveguide electrooptic device in accordance with claim 16 wherein at least one of the cladding layers is an organic polymer.

31. A waveguide electrooptic device in accordance with claim 16 wherein the coupling means are a pair of prisms.

32. A waveguide electrooptic device in accordance with claim 16 wherein the coupling means are a pair of diffraction gratings.

33. A waveguide electrooptic device in accordance with claim 16 wherein the electrodes are situated in a spaced proximity with one electrode on each opposing side of the thin film waveguide.

34. A waveguide electrooptic device in accordance with claim 16 wherein the electrodes are connected to a DC voltage source.

35. A waveguide electrooptic device in accordance with claim 16 wherein the electrodes are connected to an AC voltage source.

36. A waveguide electrooptic device in accordance with claim 16 wherein the electromagnetic radiation is a laser beam.

37. A waveguide electrooptic device in accordance with claim 16 wherein the polarization-sensitive analyzer is a polarizer which is crossed relative to the polarization plane of waveguided radiation in the absence of a moderating electric field.

38. A waveguide electrooptic device in accordance with claim 16 wherein the photodetector means is a photodiode.

39. A waveguide electrooptic device in accordance with claim 16 wherein the photodetector means is an optical power meter.

* * * * *

UNITED STATES PATENT OFFICE
CERTIFICATE OF CORRECTION

Patent No. 4,767,169           Dated 8/30/88

Inventor(s) C.C. Teng, D.E. Stuetz

It is certified that error appears in the above-identified patent and that said Letters Patent is hereby corrected as shown below:

In Column 1, before the Background Of The Invention section, please insert the following paragraph:

"This invention was made with Government support under Contract No. F49620-84-C-0110 awarded by the Department of Defense (DOD). The Government has certain rights in this invention."

Signed and Sealed this
Fourteenth Day of November, 1989

*Attest:*

JEFFREY M. SAMUELS

*Attesting Officer*      *Acting Commissioner of Patents and Trademarks*